United States Patent
Okada

(10) Patent No.: US 11,226,808 B2
(45) Date of Patent: Jan. 18, 2022

(54) APPLICATION EXECUTION DEVICE, APPLICATION EXECUTION METHOD, AND RECORDING MEDIUM

(71) Applicant: NEC Corporation, Tokyo (JP)

(72) Inventor: Yoshihiro Okada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/964,408

(22) PCT Filed: Mar. 18, 2019

(86) PCT No.: PCT/JP2019/011197
§ 371 (c)(1),
(2) Date: Jul. 23, 2020

(87) PCT Pub. No.: WO2019/181860
PCT Pub. Date: Sep. 26, 2019

(65) Prior Publication Data
US 2021/0049001 A1 Feb. 18, 2021

(30) Foreign Application Priority Data
Mar. 23, 2018 (JP) .............................. JP2018-055456

(51) Int. Cl.
*G06F 8/65* (2018.01)
*G06F 9/455* (2018.01)

(52) U.S. Cl.
CPC ............ *G06F 8/65* (2013.01); *G06F 9/45558* (2013.01); *G06F 2009/45595* (2013.01)

(58) Field of Classification Search
CPC ..... G06F 8/60; G06F 8/63; G06F 8/65; G06F 8/71; G06F 9/45558
See application file for complete search history.

(56) References Cited

U.S. PATENT DOCUMENTS

| 10,430,378 | B1* | 10/2019 | Harter ..................... G06F 16/16 |
| 2016/0275287 | A1* | 9/2016 | Wiest .................. H04L 63/1441 |
| 2016/0350081 | A1* | 12/2016 | Kumar ....................... G06F 8/30 |
| 2018/0096005 | A1* | 4/2018 | Nagaraja ............... G06F 16/113 |

(Continued)

FOREIGN PATENT DOCUMENTS

JP         2017-111761 A      6/2017

OTHER PUBLICATIONS

Miller, "Tips to Reduce Docker Image Sizes", Jun. 22, 2017, pp. 1-7 (Year: 2017).*

(Continued)

*Primary Examiner* — Duy Khuong T Nguyen
(74) *Attorney, Agent, or Firm* — Sughrue Mion, PLLC

(57) ABSTRACT

An application execution device according to the present invention is included in a business system being constructed by using a container-based virtualization technique. The application execution device includes: a memory; and at least one processor coupled to the memory. The processor performs operations. The operations includes: detecting an update of a container definition file that defines an application operating in a container; and changing, when an update is detected, in order to reduce an amount of data of a container image to be generated by building the container definition file, each content of the container definition file and the container image.

5 Claims, 12 Drawing Sheets

(56) References Cited

U.S. PATENT DOCUMENTS

2018/0349150 A1* 12/2018 Wong .................... G06F 9/4493
2020/0150940 A1* 5/2020 Li ......................... G06F 8/443

OTHER PUBLICATIONS

International Search Report for PCT Application No. PCT/JP2019/011197, dated May 7, 2019.

English translation of Written opinion for PCT Application No. PCT/JP2019/011197, dated May 7, 2019.

Seigo Uchida, Construction of Build Environment and Build of Docker Image, How to make an image with a view to actual operation, WEB+DB Press, May 25, 2015, vol. 86, pp. 99 to 105, Japan.

Kazuo Murai, C&C ++ compiler/linker/assembler/debugger . . . All for Free on My PC! Construction of LLVM & GCC Development Environment for ARM, Interface, Mar. 1, 2015, vol. 41, No. 3, pp. 57 to 64, Japan.

Kenichi Nakamura, Introduction to Embedded Linux Utilization Techniques: 3 The practice of construction of an embedded Linux kernel with a focus on a construction method in a cross environment, Interface, Mar. 1, 2002, vol. 28, No. 3, pp. 29 to 38, Japan.

Yukihiro Yasuda, I Want to Make It Once! My Style Linux [Part 1], Linux WORLD, Sep. 1, 2006, vol. 5, No. 9, pp. 63 to 94, Japan.

Kazuhiro Kikuma and others, An evaluation of Software Development Environment using the OSS tool for large-scale communication software, IEICE technical report, Nov. 17, 2016, vol. 116, No. 322, pp. 61 to 66, Japan.

\* cited by examiner

APPLICATION EXECUTION DEVICE, APPLICATION EXECUTION METHOD, AND RECORDING MEDIUM

This application is a National Stage Entry of PCT/JP2019/011197 filed on Mar. 18, 2019, which claims priority from Japanese Patent Application JP2018-055456 filed on Mar. 23, 2018, the contents of all of which are incorporated herein by reference, in their entirety.

TECHNICAL FIELD

The present invention relates to an application execution device, an application execution method, and a recording medium.

BACKGROUND ART

When a business system for handling large-scale data such as big data is constructed, a container-based virtualization technique has been increasingly adopted. The container-based virtualization is a type of virtualization in which a plurality of "partitions that behave in a similar way to an independent server" referred to as containers are generated in a single operating system (OS) and the container is assigned to an individual user or service. There is no need to individually assign a central processing unit (CPU), a memory, a storage, and the like to the container. Therefore, in the business system using the container-based virtualization, an overhead of a system resource can be reduced.

Meanwhile, in recent years, DevOps has attracted attention, and the business system described above is also required to satisfy the DevOps. The DevOps refers to a work for establishing a system that can respond more flexibly and speedily to a business requirement by cooperation between development and operations. At this moment, there is no precise definition of the DevOps.

In relation to the above, for example, Patent Literature (PTL) 1 describes that a container management unit that receives an update instruction deletes (stops) a current container and updates a container template. Herein, PTL 1 describes that updating the container template may be downloading a new container template or reading a new container template previously stored in a container storage device.

CITATION LIST

Patent Literature

[PTL 1] Japanese Unexamined Patent Application Publication No. 2017-111761

SUMMARY OF INVENTION

Technical Problem

In the business system using the container-based virtualization, an application needs to be updated in order to operate the application in a latest state. In this case, it is necessary to reflect an updated content to a container image and deploy the updated container image to an execution environment. In the above, the container image is an image file that collects files required for operating the application in a container. The deployment refers to all activities for causing a software system to be available.

However, generating the container image requires a lot of time and work, and a build (e.g., compile or link) of the container image may be time-consuming.

In the container image, difference information (a difference file of a source file) of a file system used so far is accumulated as a layer for each time when the deployment to the execution environment is performed upon updating the application. Therefore, there is a possibility that a time until completion of the deployment may gradually increase for each time when the update of the application is repeated. In order to avoid an increase in time, a regular maintenance work (organization of the container image) is performed by an operator oneself of the business system, resulting in taking a considerable amount of time and work for the operator.

In other words, in development of the business system being constructed by using the container-based virtualization technique, the fact is that a mechanism for efficiently performing the development and operations (DevOps) of the application has not been proposed, as compared to development of the business system in a general on-premises environment (in-house operating environment).

The present invention has been made in order to solve the issue described above, and an object of the present invention is to provide a technique enabling improving efficiency of development and operations of an application in a business system being constructed by using a container-based virtualization technique.

Solution to Problem

An application execution device according to the present invention is included in a business system being constructed by using a container-based virtualization technique. The application execution device includes: a memory; and at least one processor coupled to the memory. The processor performs operations. The operations includes: detecting an update of a container definition file that defines an application operating in a container; and changing, when an update is detected, in order to reduce an amount of data of a container image to be generated by building the container definition file, each content of the container definition file and the container image.

An application execution method according to the present invention is an application execution method in an application execution device which is included in a business system being constructed by using a container-based virtualization technique, and includes: detecting an update of a container definition file that defines an application operating in a container; and changing, when an update is detected, in order to reduce an amount of data of a container image to be generated by building the container definition file, each content of the container definition file and the container image.

A non-transitory computer-readable recording medium according to the present invention embodies a program. The program causes a computer of an application execution device to perform a method. The application execution device is included in a business system being constructed by using a container-based virtualization technique. The method includes detecting an update of a container definition file that defines an application operating in a container; and changing, when an update is detected, in order to reduce an amount of data of a container image to be generated by building the container definition file, each content of the container definition file and the container image.

Advantageous Effects of Invention

The present invention is able to improve efficiency of the development and operations of the application in the business system being constructed by using the container-based virtualization technique.

EXAMPLE EMBODIMENT

First Example Embodiment

Figure 1:
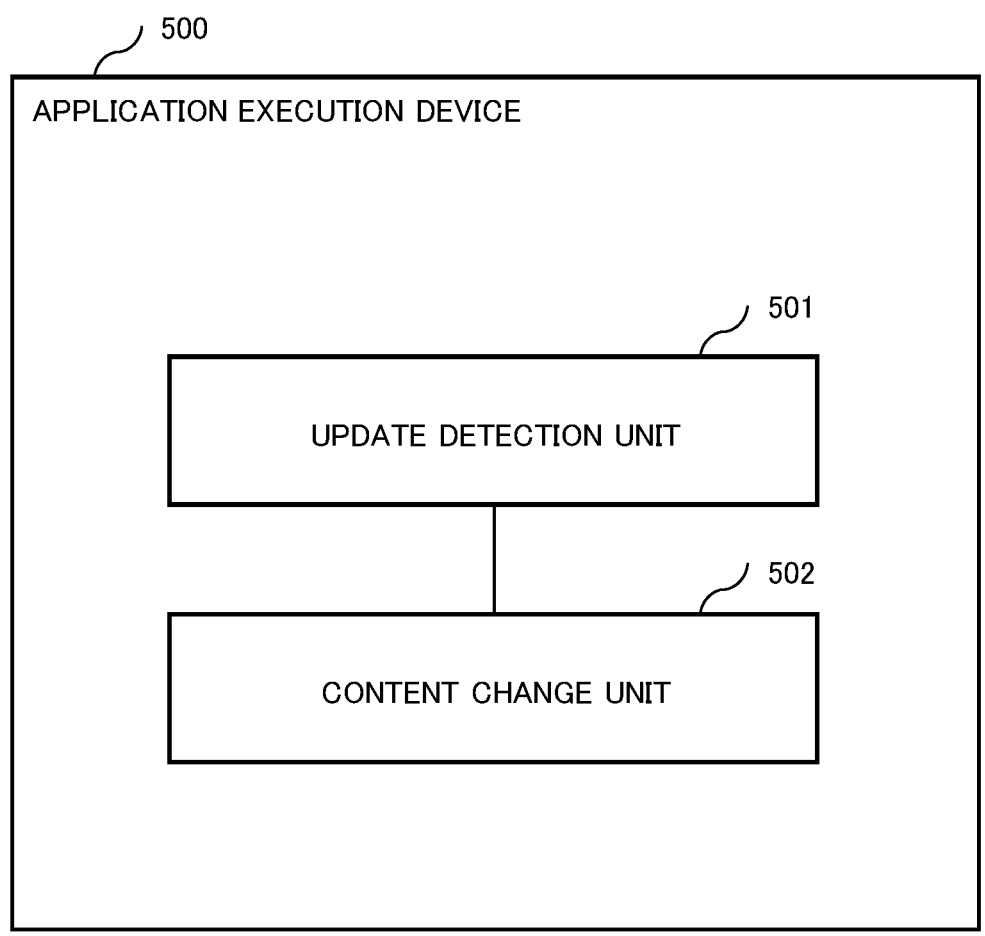
FIG. 1 is a block diagram illustrating a configuration example of an application execution device according to a first example embodiment of the present invention.

FIG. 1 is a block diagram illustrating a configuration example of an application execution device 500 according to a first example embodiment of the present invention.

The application execution device 500 is included in a business system (not illustrated in FIG. 1) being constructed by using a container-based virtualization technique. The container and the container-based virtualization technique have been already described in [Background Art].

The application execution device 500 includes an update detection unit 501 (one example of an update detection means and update detection processing) and a content change unit 502 (one example of a content change means and content change processing).

The update detection unit 501 detects an update of a container definition file that defines an application operating in a container. The content change unit 502 changes, when an update is detected, in order to reduce an amount of data of a container image to be generated by building the container definition file, each content of the container definition file and the container image.

The application execution device 500 may be constituted of an electronic circuit such as an integrated circuit (IC) or a field programmable gate array (FPGA), for example. Alternatively, the application execution device 500 may have a configuration in which a computer (e.g., a central processing unit (CPU)) executes a program stored in a memory. The application execution device 500 may also be constituted by a combination of the electronic circuit and the computer.

Figure 2:
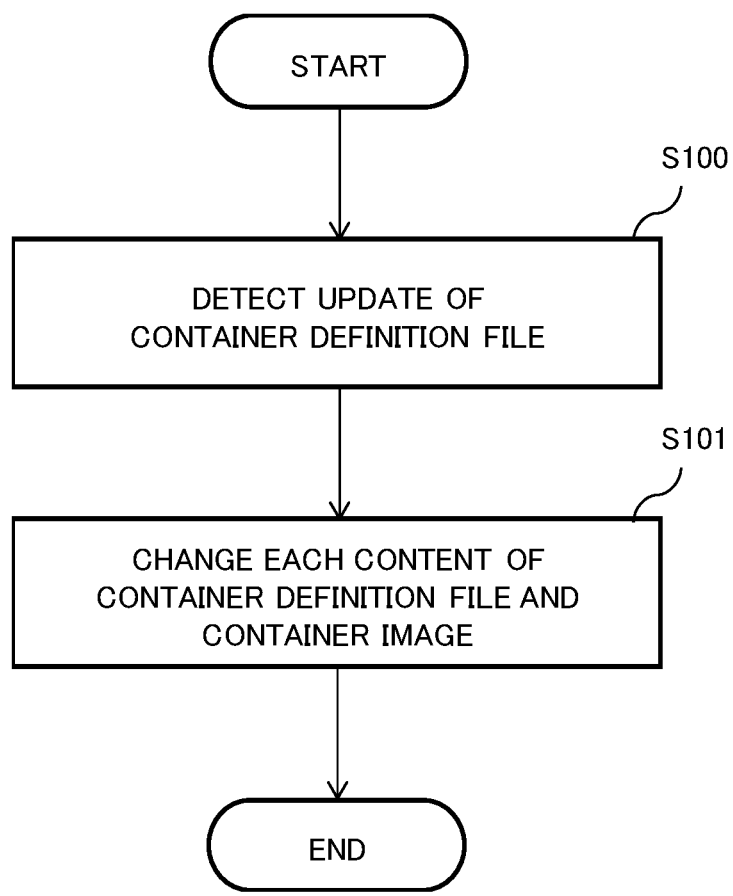
FIG. 2 is a flowchart for describing an operation example (application execution method) of the application execution device illustrated in FIG. 1.

FIG. 2 is a flowchart for describing an operation example (application execution method) of the application execution device 500 illustrated in FIG. 1.

The update detection unit 501 detects an update of a container definition file that defines an application operating in a container (step S100).

When the update is detected, the content change unit 502 changes each content of the container definition file and a container image in order to reduce an amount of data of the container image (step S101).

Detailed configuration and operation of the application execution device 500 will be described in a second example embodiment.

According to the first example embodiment described above, all the work from a build to deployment to the container, which occurs every time a container definition file required for reflecting the application to the container is generated or updated, is automatically executed by the application execution device 500. Therefore, the need for maintenance work to be regularly performed by an operator oneself of the business system in order to avoid an increase in time spent on updating can be eliminated.

Further, according to the first example embodiment, processing for reducing weight of the container image is automatically executed by the application execution device 500, and thus a time spent on updating the application for the container can be reduced.

In other words, the first example embodiment described above is able to improve efficiency of development and operations of the application in the business system being constructed by using the container-based virtualization technique.

Second Example Embodiment (Description of Configuration)

Figure 3:
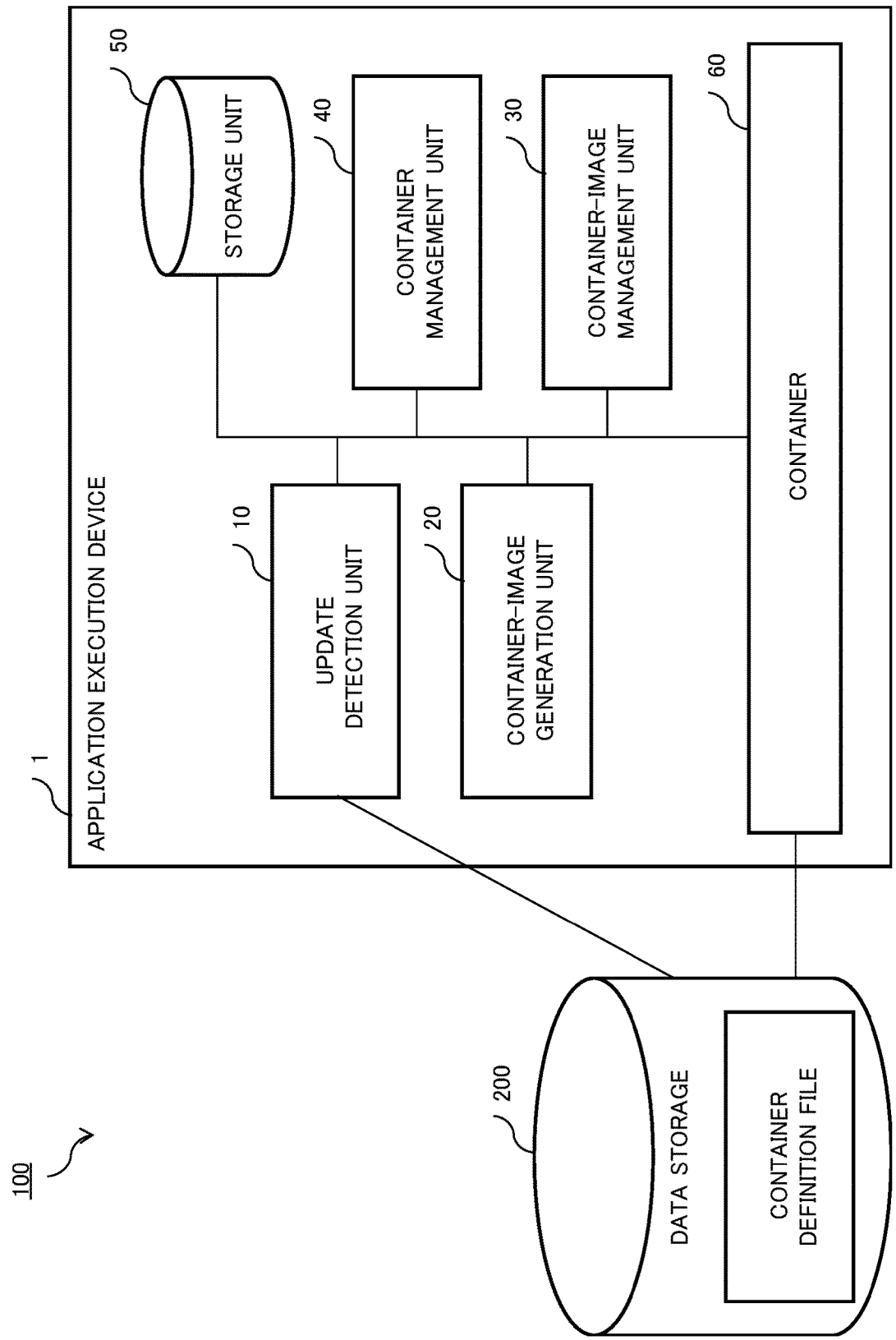
FIG. 3 is a block diagram illustrating a configuration example of a business system according to a second example embodiment of the present invention.

FIG. 3 is a block diagram illustrating a configuration example of a business system 100 according to a second example embodiment of the present invention. The business system 100 includes an application execution device 1 and a data storage 200.

The application execution device 1 includes a configuration based on the application execution device 500 illustrated in FIG. 1, and executes at least one application by using the container-based virtualization technique. A business to be executed by the application is, for example, product demand forecasting, sales price forecasting, accounting management task, customer management task, product management task, production management task, or salary management task. The business to be executed by the application is not limited to the above. Further, the application execution device 1 may be either of a physical machine and a virtual machine.

The application execution device 1 includes an update detection unit 10, a container-image generation unit 20, a container-image management unit 30, a container management unit 40, a storage unit 50, and at least one container 60. The update detection unit 10 includes the configuration of the update detection unit 501 in FIG. 1. Further, a collection of the container-image generation unit 20, the container-image management unit 30, and the container management unit 40 is associated to a specific example of the content change unit 502 in FIG. 1.

The update detection unit 10 detects an update of a container definition file that defines an application operating in the container 60. When the update of the container definition file is detected, the update detection unit 10 instructs the container-image generation unit 20 to update a container image by using the updated container definition file.

Details of the container-image generation unit 20 and the container management unit 40 will be described later.

The container-image management unit 30 manages the container image in a repository format and notifies the update of the container image.

The storage unit 50 stores a file and an image output by each processing unit operating in the application execution device 1.

At least one container 60 is provided, and executes a predetermined application which is assigned thereto.

The data storage 200 stores various files and data to be used by the application. For example, the data storage 200 stores the container definition file.

Figure 4:
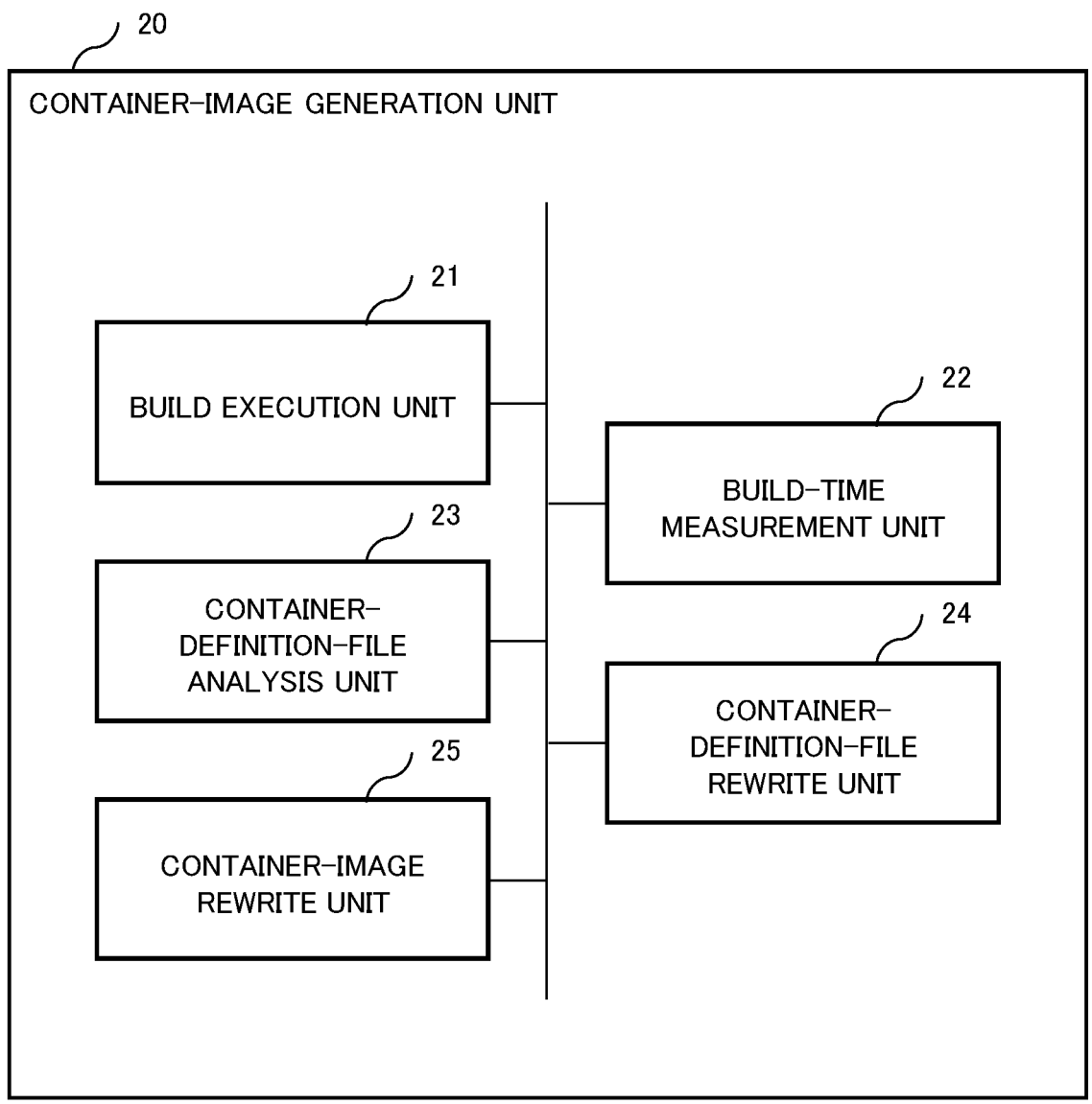
FIG. 4 is a block diagram illustrating a configuration example of a container-image generation unit illustrated in FIG. 3.

FIG. 4 is a block diagram illustrating a configuration example of the container-image generation unit 20 illustrated in FIG. 3. As illustrated in FIG. 4, the container-image generation unit 20 includes a build execution unit 21, a build-time measurement unit 22, a container-definition-file analysis unit 23, a container-definition-file rewrite unit 24, and a container-image rewrite unit 25.

The build execution unit 21 builds the container definition file. The build-time measurement unit 22 measures a processing time spent on the build. The container-definition-file analysis unit 23 analyzes a content of the container definition file in which the update has been detected. The container-definition-file rewrite unit 24 changes the content of the updated container definition file. The container-image rewrite unit 25 reconstructs a configuration (e.g., a layer structure) of the container image when the build is executed.

Figure 5:
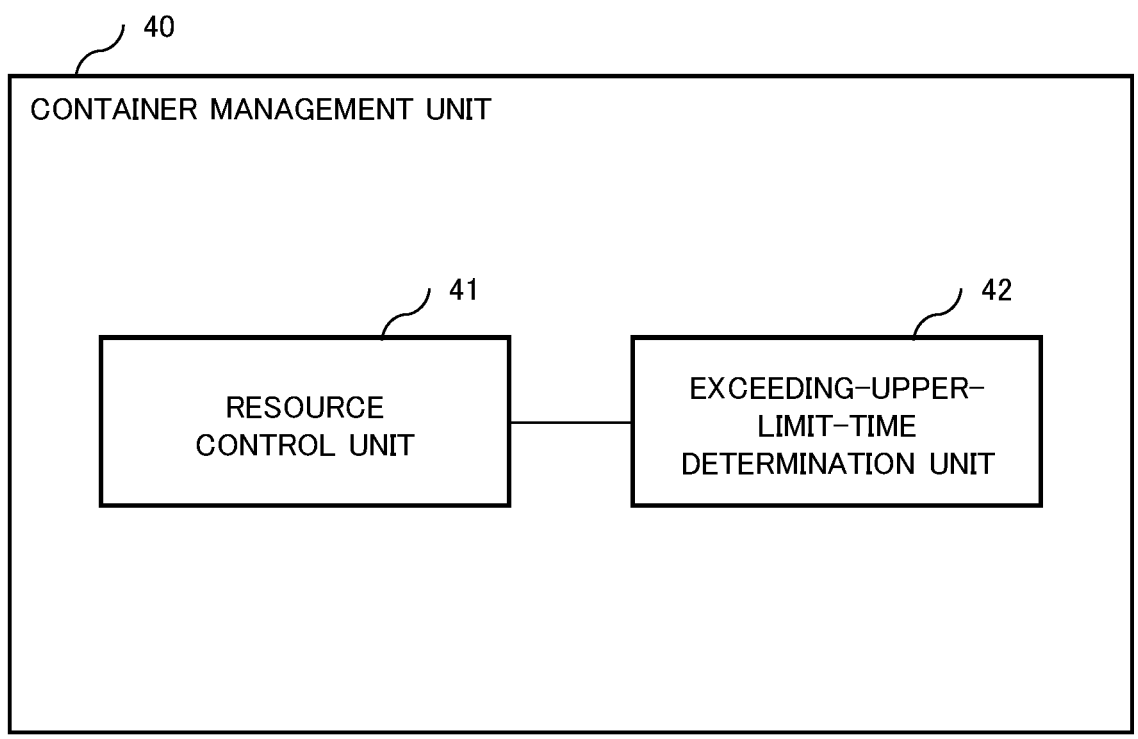
FIG. 5 is a block diagram illustrating a configuration example of a container management unit illustrated in FIG. 3.

FIG. 5 is a block diagram illustrating a configuration example of the container management unit 40 illustrated in FIG. 3. The container management unit 40 includes a resource control unit 41 and an exceeding-upper-limit-time determination unit 42.

The resource control unit 41 controls a resource required for starting the container. The exceeding-upper-limit-time determination unit 42 determines whether an overall processing time (described later) exceeds a predetermined upper limit time (described later).

Note that the connections of the units in FIGS. 3 and 4 are just examples.

(Description of Operation)

Hereinafter, an update operation of a deployment environment in the business system 100 according to the present example embodiment will be described.

In the following description, it is assumed that, for example, a Docker®, which is one example of the container-based virtualization, is used. The description is provided assuming that a system configuration to be deployed is constituted of a general package such as Red Hat package manager or RPM package manager (RPM). Further, it is assumed that, before the following operations are executed, an operator of the business system 100 has previously set an upper limit time until the deployment environment is updated. The upper limit time is determined based on performance required for the business system 100, for example. The upper limit time is stored in the storage unit 50, for example.

Figure 6:
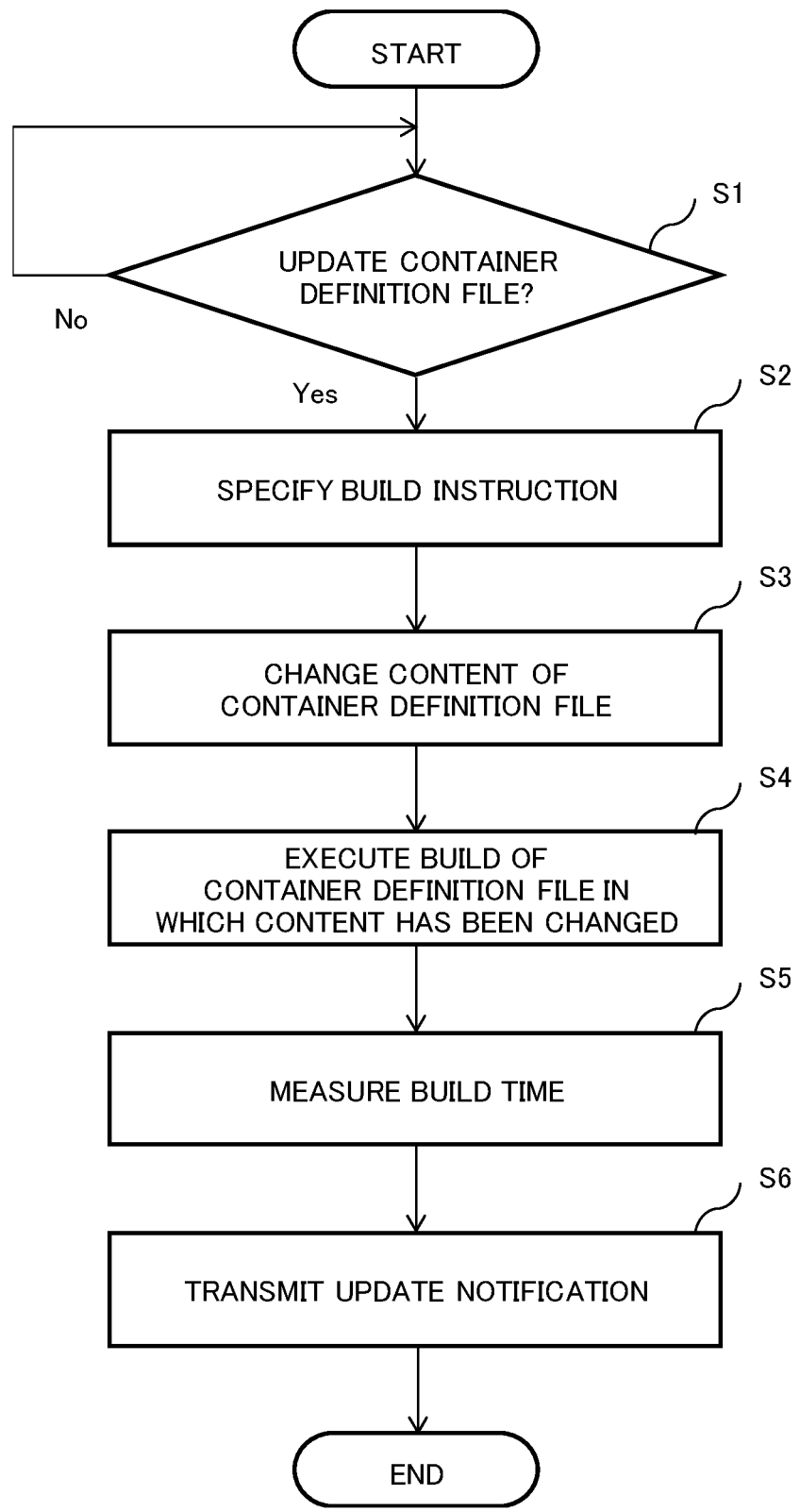
FIG. 6 is a flowchart for describing a first operation example (an application execution method) of an application execution device illustrated in FIG. 3.

FIG. 6 is a diagram for describing a first operation example (an application execution method) of the application execution device 1 illustrated in FIG. 3, and more specifically, is a flowchart describing an operation until the execution environment is constructed.

The update detection unit 10 detects whether any of the container definition files being stored in the data storage 200 have been updated (step S1). When an update is not detected (No in step S1), the processing of step S1 is executed again.

When an update is detected (Yes in step S1), the update detection unit 10 instructs the container-image generation unit 20 to execute a build (processing of updating a container image by using the container definition file in which the update has been detected).

The container-definition-file analysis unit 23 in the container-image generation unit 20 analyzes, in response to the instruction from the update detection unit 10, the container definition file in which the update has been detected, and specifies the build instruction (e.g., make or rpmbuild) (Step S2).

The container-definition-file rewrite unit 24 in the container-image generation unit 20 changes a content of the updated container definition file in the data storage 200 (step S3). Herein, a source file described in the build instruction specified in step S2 is, so to speak, an intermediate file until the execution environment is constructed by updating the deployment environment (i.e., until the build is completed by the build instruction), and is a file to be unnecessary after the execution environment is constructed. Thus, in step S3, the container-definition-file rewrite unit 24 adds, to the container definition file in which the update has been detected, a delete instruction for deleting the source file to be used during the execution of the build instruction after the execution of the build instruction is completed.

The build execution unit 21 in the container-image generation unit 20 executes the build of the container definition file having been rewritten by adding the delete instruction in this way, according to the build instruction having been specified in step S2 (step S4). In other words, the build execution unit 21 instructs the container-image rewrite unit 25, and the container-image rewrite unit 25 reconstructs (or also referred to as updates) the configuration of the container image stored in the data storage 200, for example, a layer structure.

When the build of the container definition file is executed, the build-time measurement unit 22 in the container-image generation unit 20 measures a build time being a processing time of the above-described build (step S5). The measured build time is stored in the storage unit 50, for example. The update detection unit 10 stores the container image having been updated by executing the build in the container-image management unit 30. The container-image management unit 30 transmits an update notification indicating that the container image has been updated to the container management unit 40 (step S6).

Figure 7:
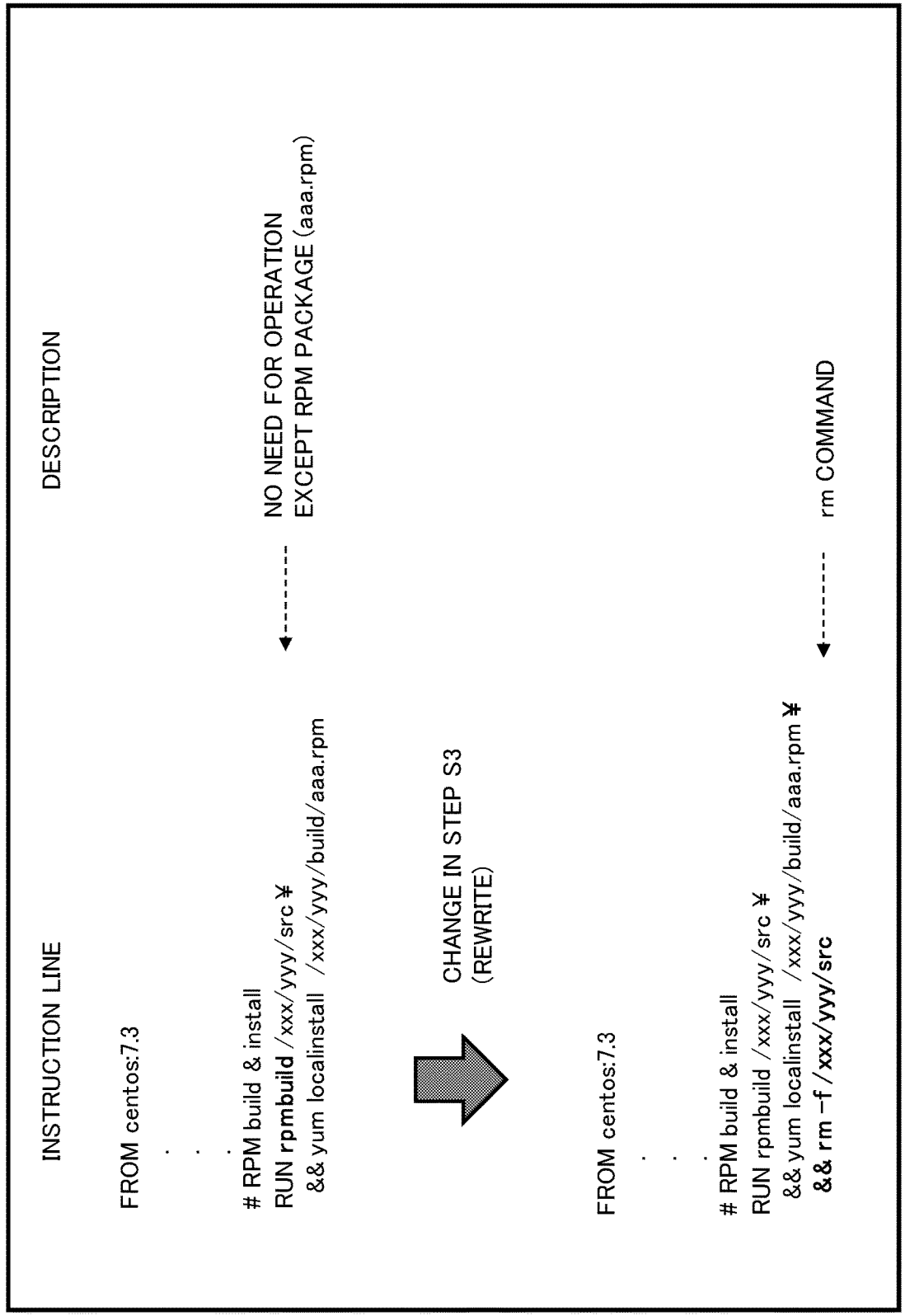
FIG. 7 is a diagram for describing processing of rewriting a build execution step in order to delete an intermediate file (a source file).

FIG. 7 is a diagram for describing the processing (processing of step S3) of rewriting the execution step of the build in the container definition file in order to delete the source file. As illustrated in FIG. 7, an "rm" command for deleting the source file (/xxx/yyy/src) is added to an instruction line after changing in step S3. Adding the rm command prohibits the source file from being added to the container image.

Figure 8:
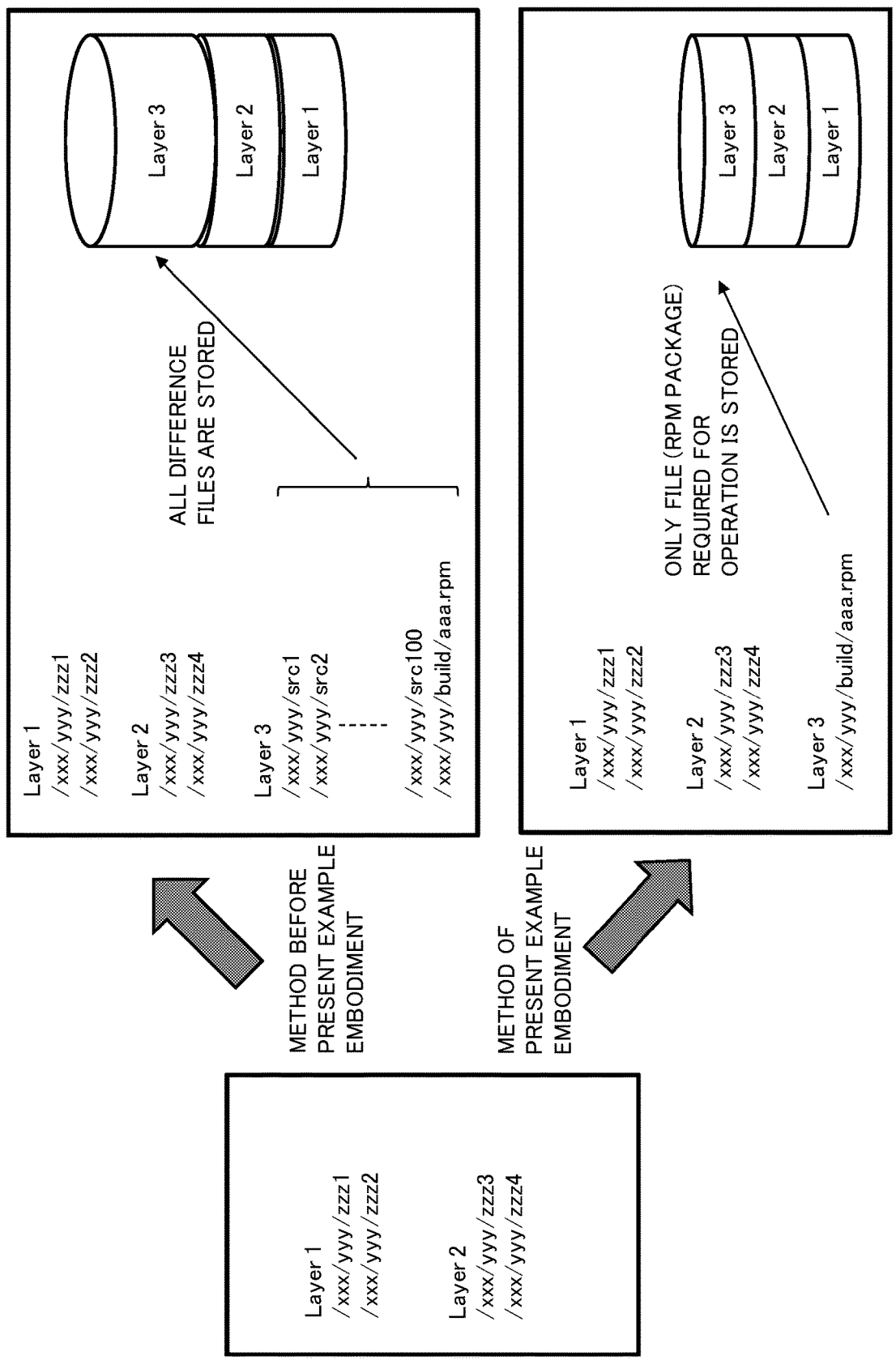
FIG. 8 is a diagram illustrating how weight of a container image is reduced by deleting the intermediate file (source file).

FIG. 8 is a diagram illustrating how weight of the container image is reduced by deleting the source file. As is clear from FIG. 8, in a layer 3, the source file (difference file) is not stored in the container-image management unit 30 and only a file (aaa.rpm) necessary for deploying to the execution environment is stored, due to the execution of the flow illustrated in FIG. 6.

Figure 9:
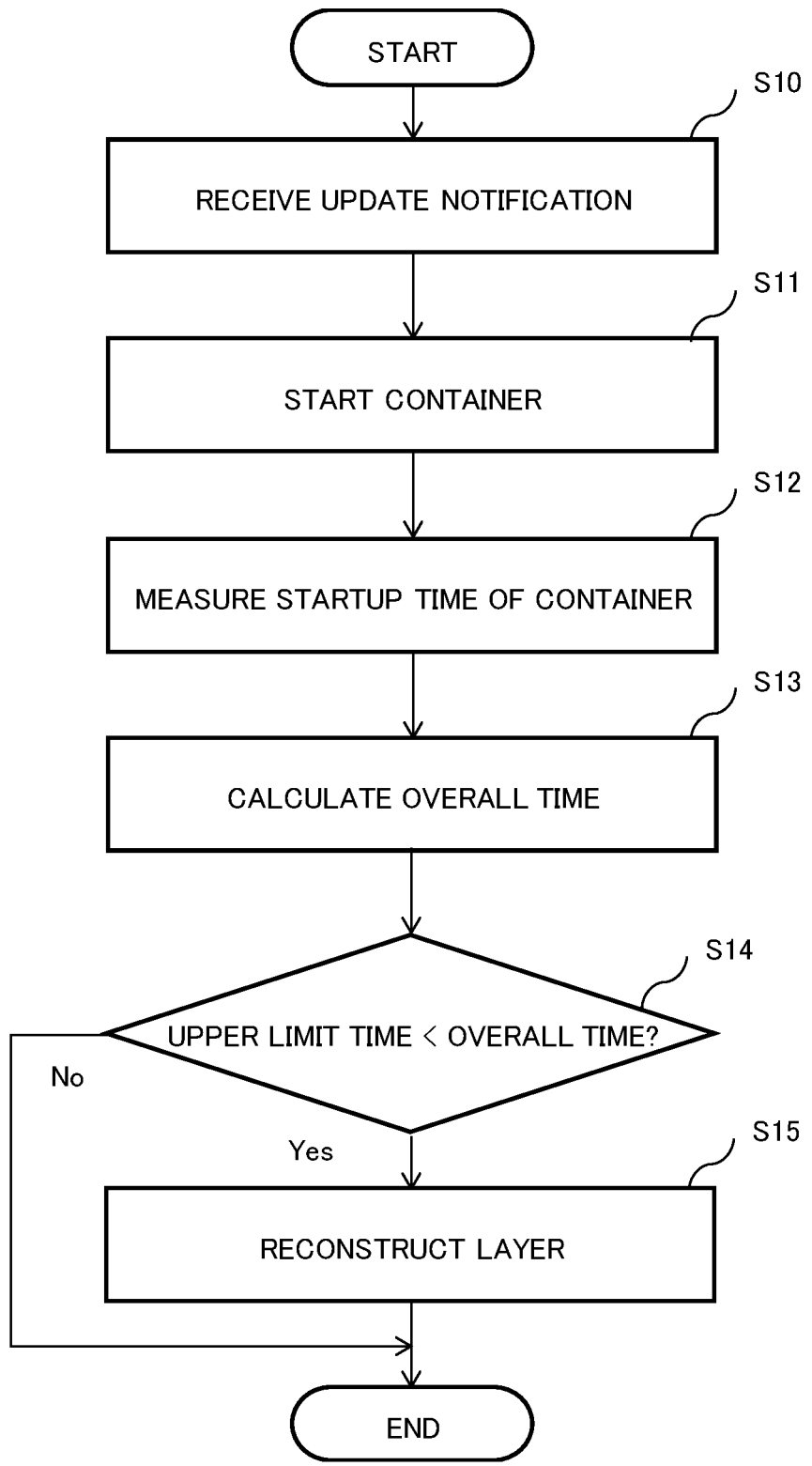
FIG. 9 is a flowchart for describing a second operation example (an application execution method) of the application execution device illustrated in FIG. 3.

FIG. 9 is a diagram for describing a second operation example (an application execution method) of the application execution device 1 illustrated in FIG. 3, and more specifically, is a flowchart describing an operation at a time of starting the container. The processing illustrated in the flowchart of FIG. 9 is usually executed after the processing illustrated in the flowchart of FIG. 6 is completed.

The resource control unit 41 in the container management unit 40 illustrated in FIG. 5 receives an update notification from the container-image management unit 30 (step S10). The resource control unit 41 sequentially stops the operating containers, acquires a new updated container image from the container-image management unit 30, and starts the container 60 (step S11).

The exceeding-upper-limit-time determination unit 42 in the container management unit 40 measures the startup time of the container (step S12). The measured startup time is stored in the storage unit 50, for example. The exceeding-upper-limit-time determination unit 42 calculates an overall time from the update of the container definition file until completion of the deployment of the update by using the startup time and the already-measured build time (see step S5 in FIG. 4) (step S13).

The exceeding-upper-limit-time determination unit 42 determines whether the overall processing time exceeds a predetermined upper limit time (step S14). When the overall processing time does not exceed the upper limit time (No in step S14), the flow ends.

Figure 10:
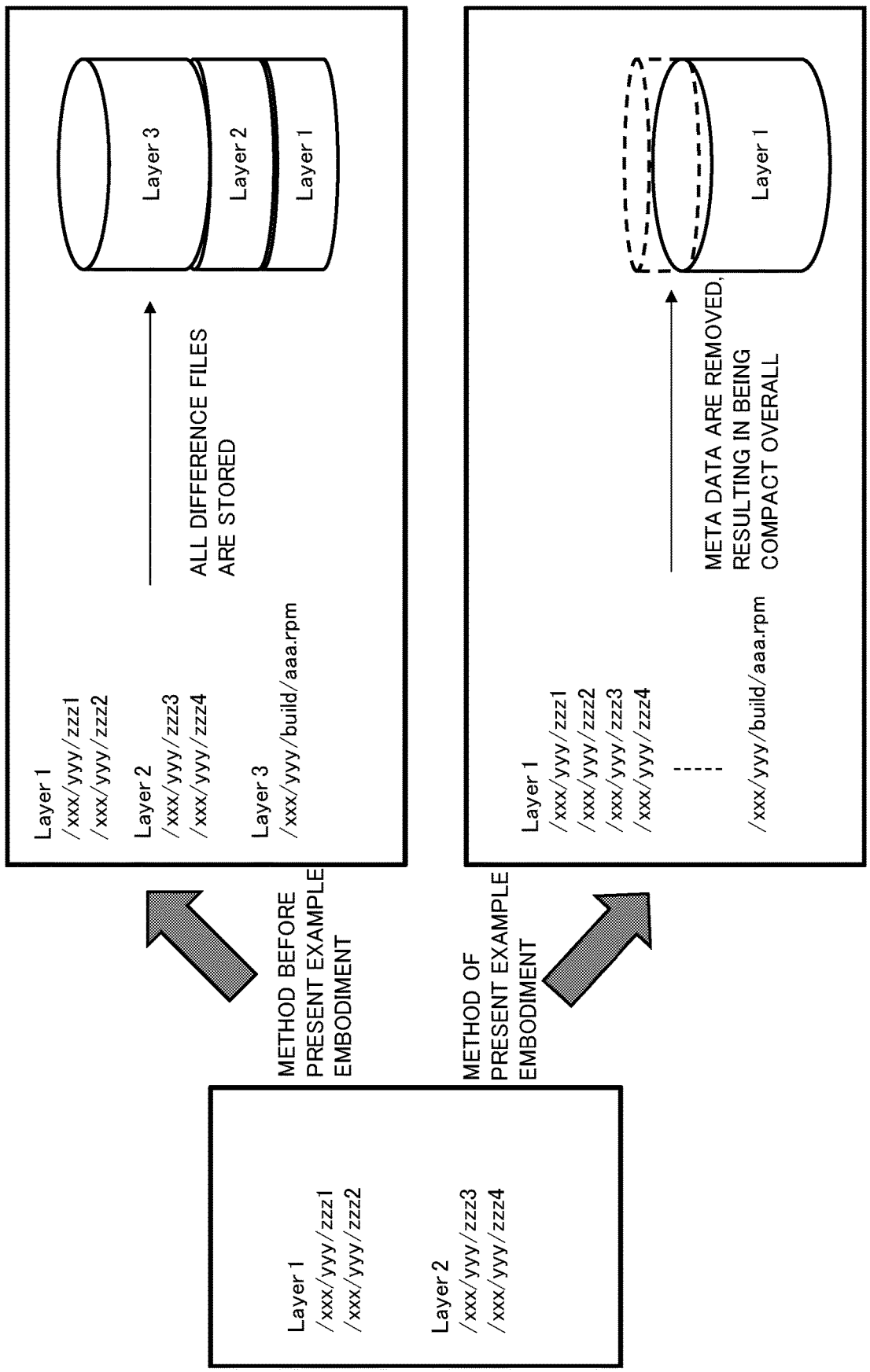
FIG. 10 is a diagram describing container-image update processing by layer integration.

When the upper limit time is exceeded (Yes in step S14), the container-image rewrite unit 25 reconstructs a layer structure included in the container image to be stored in the container-image management unit 30 (step S15). Specifically, as illustrated in FIG. 10, the container-image rewrite unit 25 integrates, by once removing the old layer structure (layers 1 to 3 in FIG. 10) and also removing meta data, a plurality of layers (layers 1 to 3) into one layer (layer 1). The Meta data are not certain data as such, but data that describe an attribute representing the data and related information. FIG. 10 illustrates the layer 1 that becomes lightweight by eliminating the meta data and is provided by the layers being integrated into one.

(Description of Advantageous Effects)

According to the second example embodiment described above, all the work from the build to the deployment to the container, which occurs every time when the container definition file required for reflecting the application to the container is generated and updated, is automatically executed by the application execution device 1. Therefore, the need for maintenance work to be regularly performed by an operator oneself of the business system in order to avoid an increase in time spent on updating can be eliminated.

Further, according to the second example embodiment, various processing for reducing weight of the container image are automatically executed by the application execution device 1, and thus a time spent on updating the application for the container can be shortened. The various processing is, for example, processing of adding a delete instruction for deleting a source file which is an intermediate file, and processing of removing meta data and integrating layers into one layer.

In other words, the second example embodiment described above is able to improve efficiency of the development and operations of the application in the business system 100 to be constructed by using the container-based virtualization technique.

Third Example Embodiment

Figure 11:
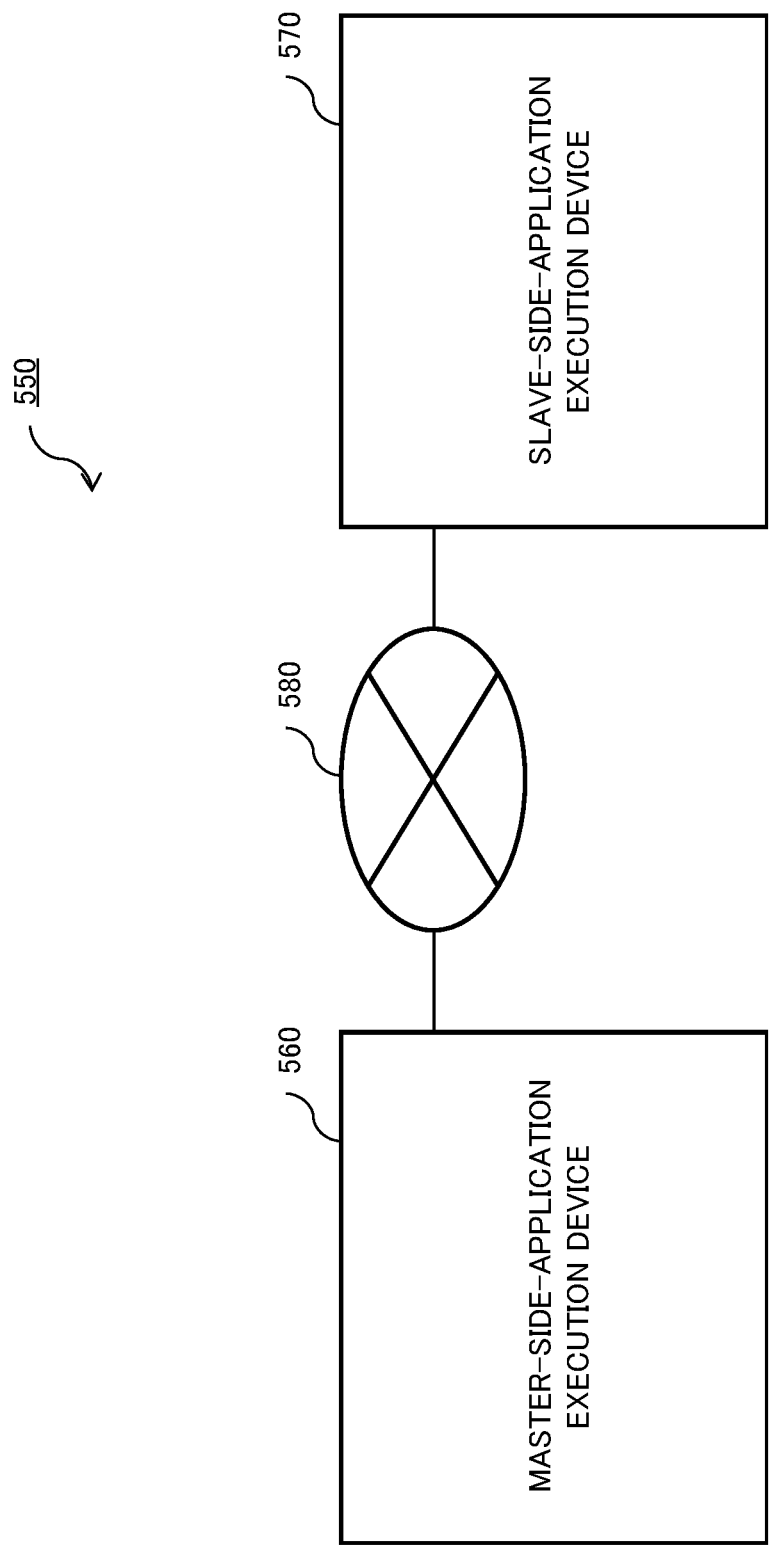
FIG. 11 is a block diagram illustrating a configuration example of an application execution system according to a third example embodiment of the present invention.

FIG. 11 is a block diagram illustrating a configuration example of a business system 550 according to a third example embodiment of the present invention. The business system 550 includes a master-side-application execution device 560 that operates as a master and a slave-side-application execution device 570 that operates as a slave.

The master-side-application execution device 560 and the slave-side-application execution device 570 are connected via a network 580 such as the Internet.

The master-side-application execution device 560 and the slave-side-application execution device 570 can be, for example, the application execution device of either one of the first example embodiment and the second example embodiment.

As the third example embodiment described above, by disposing the application execution devices in a distributed manner, it is possible to perform development and operations of an application further efficiently.

Fourth Example Embodiment

Figure 12:
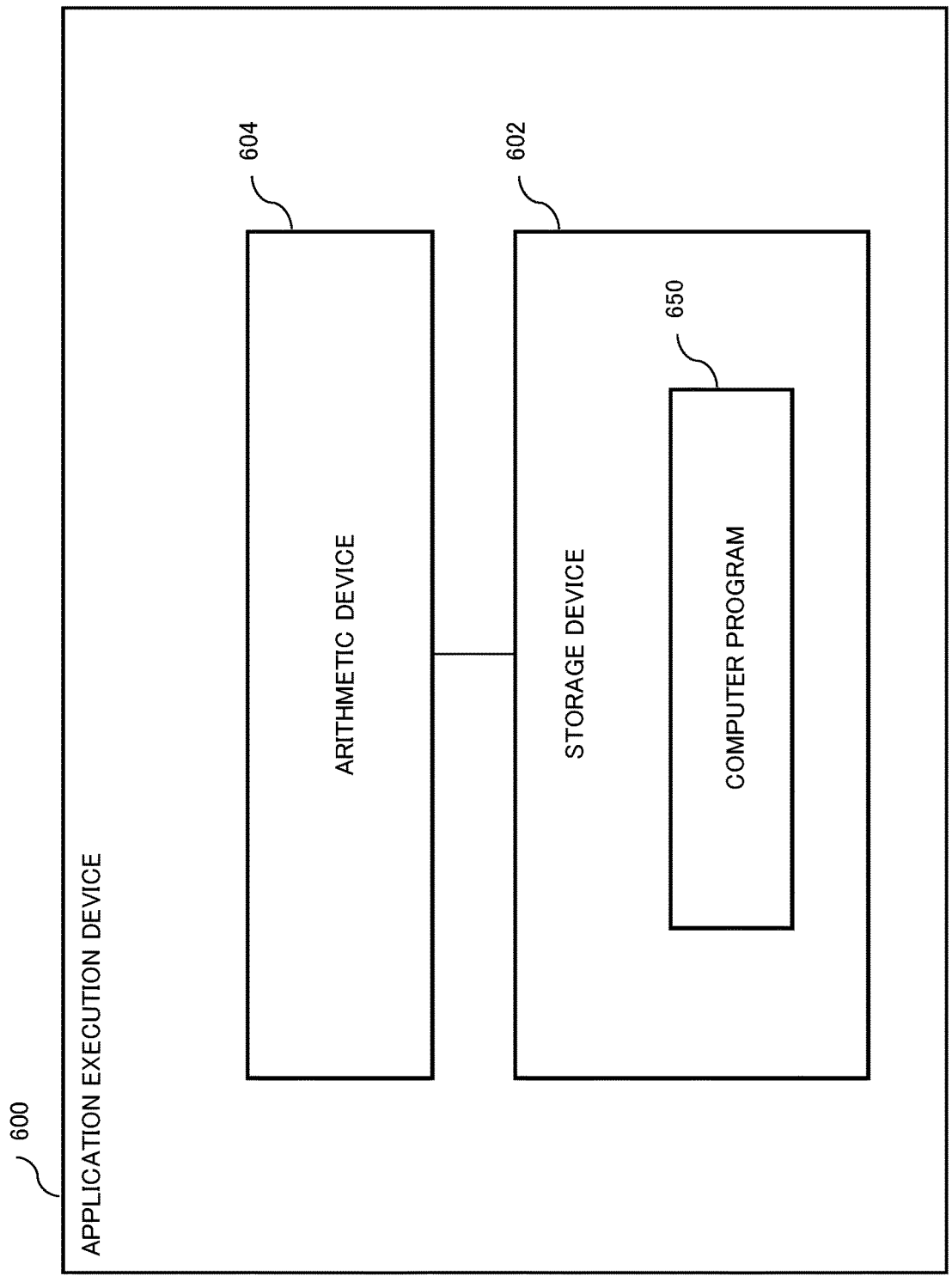
FIG. 12 is a block diagram illustrating a configuration example of an application execution device according to a fourth example embodiment of the present invention.

FIG. 12 is a block diagram illustrating a configuration example of an application execution device 600 according to a fourth example embodiment of the present invention, and more specifically, is the block diagram of the application execution device 600 in which the application execution device 500 illustrated in FIG. 1 or the application execution device 1 illustrated in FIG. 3 is implemented by a computer.

The application execution device 600 includes a storage device 602 and an arithmetic device 604 (a computer) including a processor and the like. The storage device 602 is a computer-readable recording medium, and stores a computer program 650. The computer program 650 is, for example, a program for causing the arithmetic device 604 to execute the operation described according to the first example embodiment and the operations described according to the second example embodiment.

As an example of the arithmetic device 604, one or more CPUs that read and execute a program and a memory that stores an instruction to be executed by the CPU can be cited, for example. The computer-readable recording medium is, for example, a non-transitory storage device. As an example of the non-transitory storage device, a portable medium such as an optical disk, a magnetic disk, a read only memory (ROM), and a non-volatile semiconductor memory, and a hard disk incorporated in a computer system can be cited, for example. Further, the computer-readable recording medium may be a transitory storage device. As an example of the transitory storage device, a signal line for transmitting a program via a network such as the Internet and a communication line such as a telephone line, or a volatile memory inside a computer system can be cited, for example.

Similarly to the first and the second example embodiments, the fourth example embodiment described above is able to improve efficiency of the development and operations of the application in the business system being constructed by using the container-based virtualization technique.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims. Therefore, it is needless to describe that such changed or improved forms are also included in the technical scope of the present invention. Further, the numerical values, the names of each configuration, and the like to be used in each of the example embodiments described above are merely examples and may be changed appropriately.

This application is based upon and claims the benefit of priority from Japanese patent application No. 2018-055456, filed on Mar. 23, 2018, the disclosure of which is incorporated herein in its entirety by reference.

REFERENCE SIGNS LIST

1 Application execution device
10 Update detection unit
20 Container-image generation unit
21 Build execution unit
22 Build-time measurement unit
23 Container-definition-file analysis unit
24 Container-definition-file rewrite unit
25 Container-image rewrite unit
30 Container-image management unit
40 Container management unit
41 Resource control unit
42 Exceeding-upper-limit-time determination unit
50 Storage unit
60 Container
500 Application execution device
501 Update detection unit
502 Content change unit
550 Business system
560 Master-side-application execution device
570 Slave-side-application execution device
580 Network
600 Application execution device
602 Storage device
604 Arithmetic device
650 Computer program

What is claimed is:

1. An application execution device to be included in a business system being constructed by using a container-based virtualization technique, the application execution device comprising:
a memory; and
at least one processor coupled to the memory,
the processor performing operations, the operations comprising:
detecting an update of a container definition file that defines an application operating in a container;
changing, when an update is detected, in order to reduce an amount of data of a container image to be generated by building the container definition file, each content of the container definition file and the container image;
specifying a build instruction by analyzing the container definition file in which an update is detected, adding a delete instruction deleting a source file being used for the execution to the container definition file in which the update is detected after the build instruction specified is executed, and executing a build of the container definition file to which the delete instruction is added; and
calculating an overall time from update of the container definition file to completion of deployment of the update, determining whether the overall time exceeds a predetermined upper limit time, and reconstructing, when the overall time exceeds the upper limit time, a structure of a layer to be included in the container image, and
wherein the reconstructing is the process of integrating a plurality of the layers into one of the layers by once removing the old structure and also removing meta data.

2. The application execution device according to claim 1, wherein the operations further comprise
measuring, when a build of the container definition file in which the delete instruction is added is executed, a build time being a time of the build, measuring a startup time of a container, and calculating the overall time by using the startup time and the build time.

3. The application execution device according to claim 1, wherein the upper limit time is determined based on performance being required for the business system.

4. An application execution method in an application execution device to be included in a business system being constructed by using a container-based virtualization technique, the application execution method comprising:
detecting an update of a container definition file that defines an application operating in a container;
changing, when an update is detected, in order to reduce an amount of data of a container image to be generated by building the container definition file, each content of the container definition file and the container image;
specifying a build instruction by analyzing the container definition file in which an update is detected, adding a delete instruction deleting a source file being used for the execution to the container definition file in which the update is detected after the build instruction specified is executed, and executing a build of the container definition file to which the delete instruction is added; and
calculating an overall time from update of the container definition file to completion of deployment of the update, determining whether the overall time exceeds a predetermined upper limit time, and reconstructing, when the overall time exceeds the upper limit time, a structure of a layer to be included in the container image, and
wherein the reconstructing is the process of integrating a plurality of the layers into one of the layers by once removing the old structure and also removing meta data.

5. A non-transitory computer-readable recording medium embodying a program, the program causing a computer of an application execution device to perform a method, the application execution device to be included in a business system being constructed by using a container-based virtualization technique, the method comprising:
detecting an update of a container definition file that defines an application operating in a container;
changing, when an update is detected, in order to reduce an amount of data of a container image to be generated by building the container definition file, each content of the container definition file and the container image;

specifying a build instruction by analyzing the container definition file in which an update is detected, adding a delete instruction deleting a source file being used for the execution to the container definition file in which the update is detected after the build instruction specified is executed, and executing a build of the container definition file to which the delete instruction is added; and calculating an overall time from update of the container definition file to completion of deployment of the update, determining whether the overall time exceeds a predetermined upper limit time, and reconstructing, when the overall time exceeds the upper limit time, a structure of a layer to be included in the container image, and wherein the reconstructing is the process of integrating a plurality of the layers into one of the layers by once removing the old structure and also removing meta data.

\* \* \* \* \*